US008550762B2

(12) United States Patent
Ueda et al.

(10) Patent No.: US 8,550,762 B2
(45) Date of Patent: Oct. 8, 2013

(54) ARTICLE TRANSPORTING APPARATUS

(75) Inventors: Yuichi Ueda, Yasu (JP); Takashi Fujita, Higashiomi (JP)

(73) Assignee: Daifuku Co., Ltd., Osaka (JP)

( * ) Notice: Subject to any disclaimer, the term of this patent is extended or adjusted under 35 U.S.C. 154(b) by 493 days.

(21) Appl. No.: 12/526,387

(22) PCT Filed: Feb. 5, 2008

(86) PCT No.: PCT/JP2008/051824
§ 371 (c)(1),
(2), (4) Date: Dec. 30, 2009

(87) PCT Pub. No.: WO2008/099712
PCT Pub. Date: Aug. 21, 2008

(65) Prior Publication Data

US 2010/0322752 A1 Dec. 23, 2010

(30) Foreign Application Priority Data

Feb. 14, 2007 (JP) ................................ 2007-033555

(51) Int. Cl.
*B65G 1/00* (2006.01)

(52) U.S. Cl.
USPC .......................................................... 414/281

(58) Field of Classification Search
USPC .......................... 414/282, 266, 267, 281, 286
See application file for complete search history.

(56) References Cited

U.S. PATENT DOCUMENTS

| | | | | |
|---|---|---|---|---|
| 3,586,193 A | | 6/1971 | Wilkinson | |
| 3,661,280 A | | 5/1972 | Atwater | |
| 3,724,688 A | * | 4/1973 | Atwater | 414/282 |
| 3,791,536 A | * | 2/1974 | Moeller | 414/282 |
| 3,934,741 A | * | 1/1976 | Wentz | 414/663 |
| 3,993,202 A | * | 11/1976 | Neitzel | 414/282 |
| 4,331,418 A | * | 5/1982 | Klebe | 414/277 |
| 2012/0070255 A1 | * | 3/2012 | Tsujimoto et al. | 414/267 |

FOREIGN PATENT DOCUMENTS

| | | |
|---|---|---|
| JP | 4960476 | 5/1974 |
| JP | 3115094 A | 5/1991 |
| JP | 05-014096 U1 | 2/1993 |
| JP | 6-219515 A | 8/1994 |
| JP | 8-133416 A | 5/1996 |
| JP | 9012111 | 1/1997 |
| JP | 2002-265013 A | 9/2002 |
| JP | 2002-265015 A | 9/2002 |
| JP | 2004-059190 A | 2/2004 |
| JP | 2004-091149 A | 3/2004 |
| JP | 2006-219233 A | 8/2006 |

* cited by examiner

*Primary Examiner* — Joshua Rudawitz
(74) *Attorney, Agent, or Firm* — The Webb Law Firm

(57) ABSTRACT

An article transporting apparatus includes a traveling carriage adapted to run along a travel rail, a pair of front and rear lift guide masts mounted on the traveling carriage to be spaced apart from each other and connected to each other at upper ends thereof by an upper frame, a lift adapted to vertically move along the pair of front and rear lift guide masts, and an article transfer device provided in the lift, wherein one of the pair of front and rear lift guide masts includes a plurality of posts mounted upright to be spaced apart from each other and a plurality of diagonal members for connecting the adjacent posts to each other, the one of the pair of front and rear lift guide masts having a horizontal section area greater than that of the other of the pair of front and rear lift guide masts.

3 Claims, 7 Drawing Sheets

ARTICLE TRANSPORTING APPARATUS

BACKGROUND OF THE INVENTION

1. Field of the Invention

The present invention relates to an article transporting apparatus comprising a traveling carriage adapted to run along a travel rail, a pair of front and rear lift guide masts mounted upright on the traveling carriage to be spaced apart from each other and connected to each other at upper ends thereof by an upper frame, a lift vertically movable along the pair of front and rear lift guide masts, and an article transfer device provided in the lift.

2. Description of Related Art

The article transporting apparatus noted above is used in an automated warehouse, for example, for running the traveling carriage and moving the lift vertically thereby moving the article transfer device to any one of a plurality of storage sections provided in an article storage shelf in order to store an article in the storage section or to retrieve the article from the storage section. The article transporting apparatus is adapted to perform storing operations for placing the article to be carried in on any of the storage sections, or retrieving operations for retrieving the article stored in any one of the storage sections.

The conventional article transporting apparatus comprises the lift guide masts mounted upright on longitudinal opposite ends of the traveling carriage, each of the pair of front and rear lift guide masts including posts (posts having a rectangular horizontal section, for example), and a plurality of cord-like members connected to opposite ends of the lift for suspending and supporting the lift, the lift being vertically movable along the pair of front and rear lift guide masts (see Patent Document 1, for example).

Patent Document 1: Japanese Unexamined Patent Application Publication No. 2004-59190

SUMMARY OF THE INVENTION

With the conventional article transporting apparatus noted above, the article can be transported to the plurality of storage sections arranged vertically and horizontally not only by running the traveling carriage along the travel rail but also by moving the lift vertically along the lift guide masts.

Some types of the article storage shelves are tall and include more storage sections arranged vertically than horizontally in light of constraints such as limited installation space. Thus, it is required that the articles be transported to a higher position (40 meters from the ground, for example) in the article transporting apparatus.

In order to transport the articles to higher positions, the height of the lift guide masts needs to be increased. However, if the height of the lift guide masts is increased, the strength of the lift guide masts is also required to be increased in order to support the lift appropriately.

Here, it is proposed that the strength of the lift guide masts be increased by enlarging the diameter of the posts or increasing the thickness of the posts, for example. However, the weight of the lift guide masts is increased if the strength of the lift guide masts is increased. Thus, the increase in the strength of both of the front and rear lift guide masts results in the increase in the weight of the traveling carriage. The increase in the weight of the traveling carriage would cause some problems that the running speed of the traveling carriage is decreased or a driving device for running the traveling carriage is required to have more capability, for example.

The present invention has been made having regard to the above aspects, and its object is to provide an article transporting apparatus that is capable of transporting articles to higher positions while restraining the increase of the weight of the traveling carriage.

In order to achieve the above-noted object, the first characteristic feature of the article transporting apparatus in accordance with the present invention lies in comprising a traveling carriage adapted to run along a travel rail, a pair of front and rear lift guide masts mounted on the traveling carriage to be spaced apart from each other and connected to each other at upper ends thereof by an upper frame, a lift adapted to vertically move along the pair of front and rear lift guide masts, and an article transfer device provided in the lift, wherein one of the pair of front and rear lift guide masts includes a plurality of posts mounted upright to be spaced apart from each other and a plurality of diagonal members for connecting the adjacent posts to each other, the one of the pair of front and rear lift guide masts having a horizontal section area greater than that of the other of the pair of front and rear lift guide masts.

More particularly, instead of increasing the strength of both of the pair of front and rear lift guide masts equally, one of the pair of front and rear lift guide masts is adapted to have a horizontal section area greater than that of the other of the lift guide masts thereby adding more strength to one of the pair of front and rear lift guide masts than to the other of the masts. As a result, the strength can be increased with respect to both of the pair of front and rear lift guide masts.

Further, with respect to one of the front and rear lift guide masts, the plural posts are mounted upright to be spaced from each other and the adjacent posts are connected to each other through the plural diagonal members, which allows the strength of one of the masts to be increased. In addition, since the adjacent posts of the plural posts spaced part from each other are connected through the plural diagonal members, the strength can be increased while avoiding increasing the weight as much as possible compared with the construction in which the posts acting as the lift guide mast are enlarged in diameter or increased in thickness, for example.

Still further, with respect to the other of the pair of front and rear lift guide masts, the posts acting as the lift guide mast are enlarged in diameter or increased in thickness, for example, to add the strength while allowing its horizontal section area to be smaller than that of the one of the pair of front and rear lift guide masts to avoid increasing the weight as much as possible.

Hence, with respect to both of the pair of front and rear lift guide masts, the height of the lift guide masts can be increased while increasing the strength and avoiding increasing the weight as much as possible, as a result of which, the article transporting apparatus is provided that is capable of transporting the articles to higher positions while restraining the weight of the traveling carriage from being increased.

The second characteristic feature of the article transporting apparatus in accordance with the present invention lies in that the plurality of posts are mounted upright to be spaced from each other at least in a running direction of the traveling carriage, and the plurality of diagonal members are adapted to connect the posts adjacent to each other at least in the running direction of the traveling carriage.

More particularly, the diagonal members connect the posts that are adjacent to each other at least in the running direction of the traveling carriage, as a result of which the strength can be added against the force applied in the running direction of the traveling carriage. Since the lift guide masts are swung with acceleration or deceleration of the traveling carriage to exert a force in the running direction of the traveling carriage, the strength of the lift guide masts can be increased corresponding to the direction in which such a force is exerted. Therefore, the strength of the lift guide masts can be appropriately increased.

The third characteristic feature in accordance with the present invention lies in that the horizontal section of the one of the pair of front and rear lift guide masts has a rectangular shape defined by the four posts.

More particularly, the horizontal section of the one of the pair of front and rear lift guide masts has a rectangular shape defined by the four posts, which makes it easy to adjust the angle of the diagonal members to be provided relative to the posts as viewed from the top and simplify the operations for mounting the diagonal members compared with the lift guide mast having a triangular construction with the posts being disposed at the corners of the triangle. Also, the simple shape of the rectangle can simplify the overall construction, which facilitates the operations for mounting various members to be provided in the lift guide mast.

The fourth characteristic feature of the article transporting apparatus lies in further comprising a plurality of cord-like members connected to the lift at plural positions for suspending and supporting the lift, a lift driving device for moving the lift vertically with the plurality of cord-like members being collectively wound around a rotary member, and a counterweight connected to the plurality of cord-like members at the other ends thereof opposite to ends connected to the lift to move vertically in a direction opposite to the moving direction of the lift, wherein the counterweight is adapted to vertically move inside the one of the pair of front and rear lift guide masts.

More particularly, the counterweight is provided to move vertically in the direction opposite to the moving direction of the lift, which allows the lift to be vertically movable utilizing the weight of the counterweight, as a result of which a drive force required in the lift drive device can be reduced.

The counterweight is vertically movable in the interior of one of the pair of front and rear lift guide masts, and thus can be moved vertically utilizing the interior space of the lift guide mast. Thus, there is no need to provide extra space for vertically moving the counterweight, which can take advantage of space. Since one of the pair of front and rear lift guide masts has the horizontal section area greater than that of the other of the lift guide masts, a large-sized counterweight that can be adequately used for vertically moving the lift is provided.

Since a large counterweight can be provided, the number of counterweights and the number of members for supporting the counterweight can be reduced thereby reducing the cost compared with the construction in which a plurality of cord-like members are connected to a single counterweight so that each of the plurality of cord-like members is connected to the single counterweight.

DETAILED DESCRIPTION OF THE INVENTION

Embodiments of an article transporting apparatus in accordance with the present invention applied to an automated warehouse will be described hereinafter in reference to the accompanying drawings.

Figure 1:
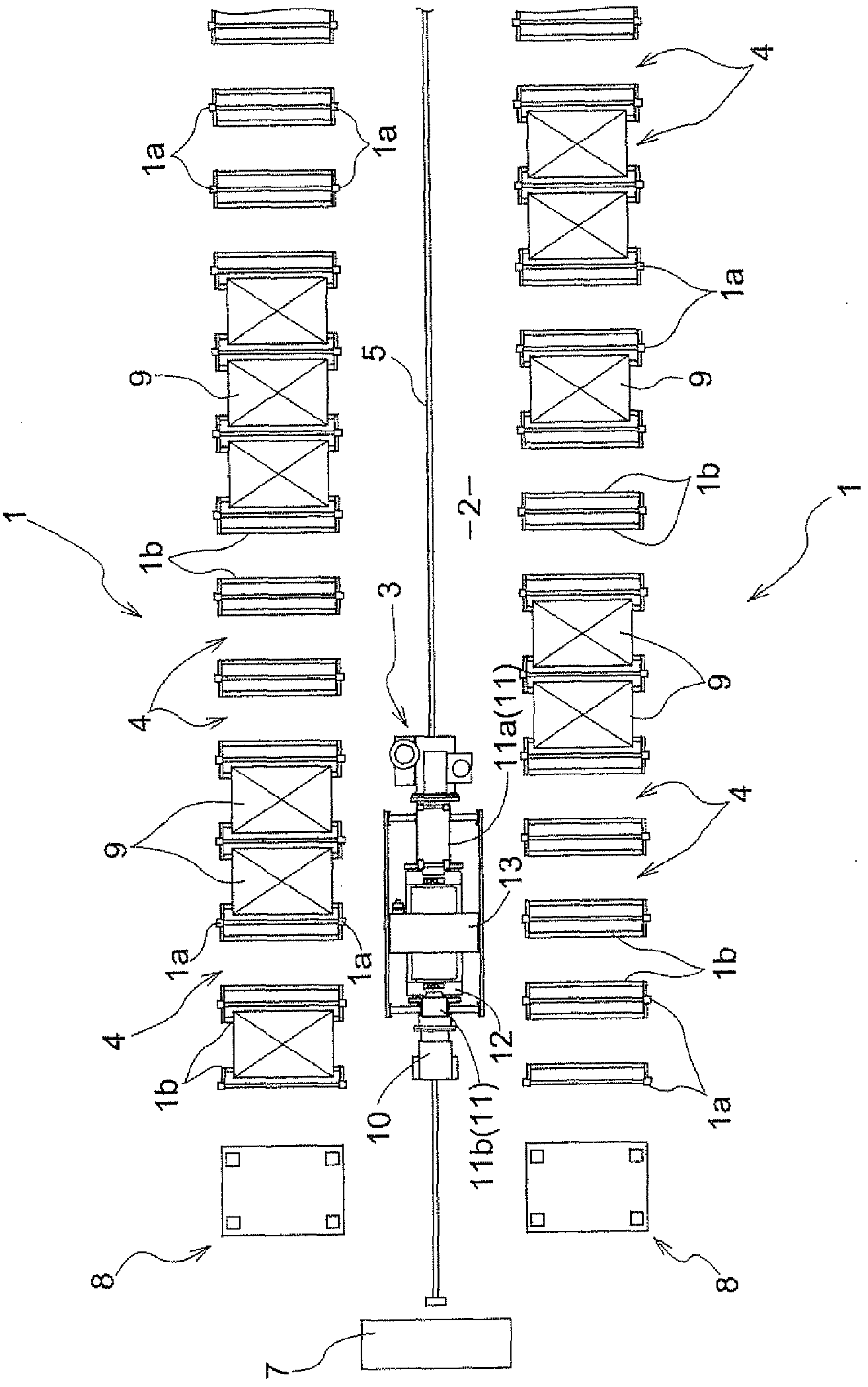
FIG. 1 is a top plan view of an automated warehouse.
Figure 2:
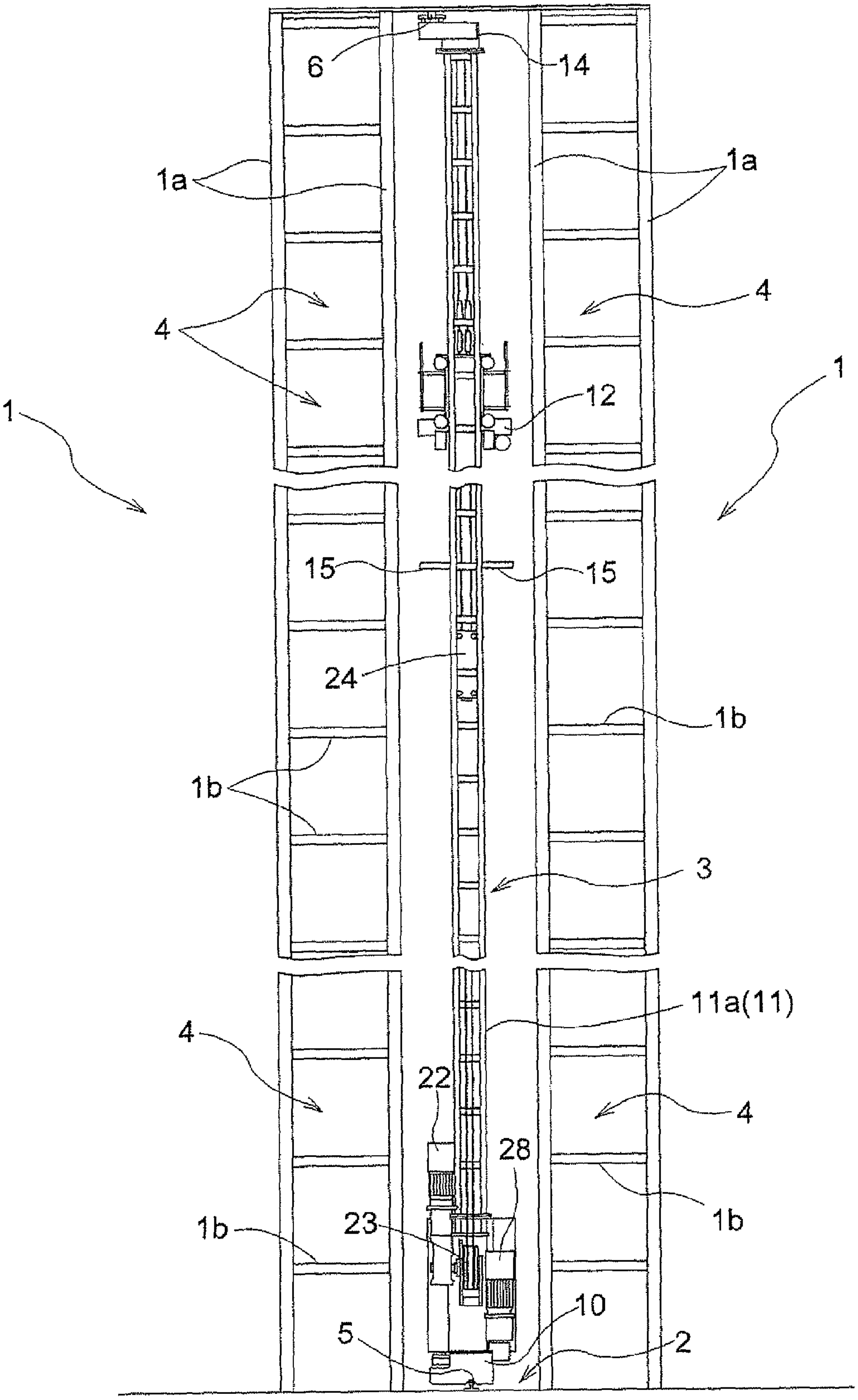
FIG. 2 is a vertical section of the automated warehouse.

As shown in FIGS. 1 and 2, the automated warehouse comprises two article storage shelves 1 spaced apart from each other with article access locations thereof facing each other, and a stacker crane 3 acting as the article transporting apparatus and automatically running along a travel route 2 defined between the two article storage shelves 1.

Each of the article storage shelves 1 includes a plurality of pairs of front and rear columns **1*a* mounted upright to be spaced from each other in a horizontal direction, and a plurality of supporting portions 1*b* each extending between the columns 1*a*** in the horizontal direction that are arranged in a vertical direction to be spaced apart from each other.

Each of the article storage shelves 1 includes a storage section 4 for storing an article 9 that is supported on each of the supporting portions **1*b*. A plurality of the storage sections 4** are arranged in both the vertical direction and the horizontal direction.

A travel rail 5 is provided in a floor side of the travel route 2 along a longitudinal direction thereof, and an upper guide rail 6 is provided in an upper side of the travel route 2 along the longitudinal direction thereof.

At one end of the travel rail 5 are provided a ground controller 7 for controlling operations of the stacker crane 3, and a pair of loading platforms 8 disposed across the travel rail 5 from each other.

Figure 3:
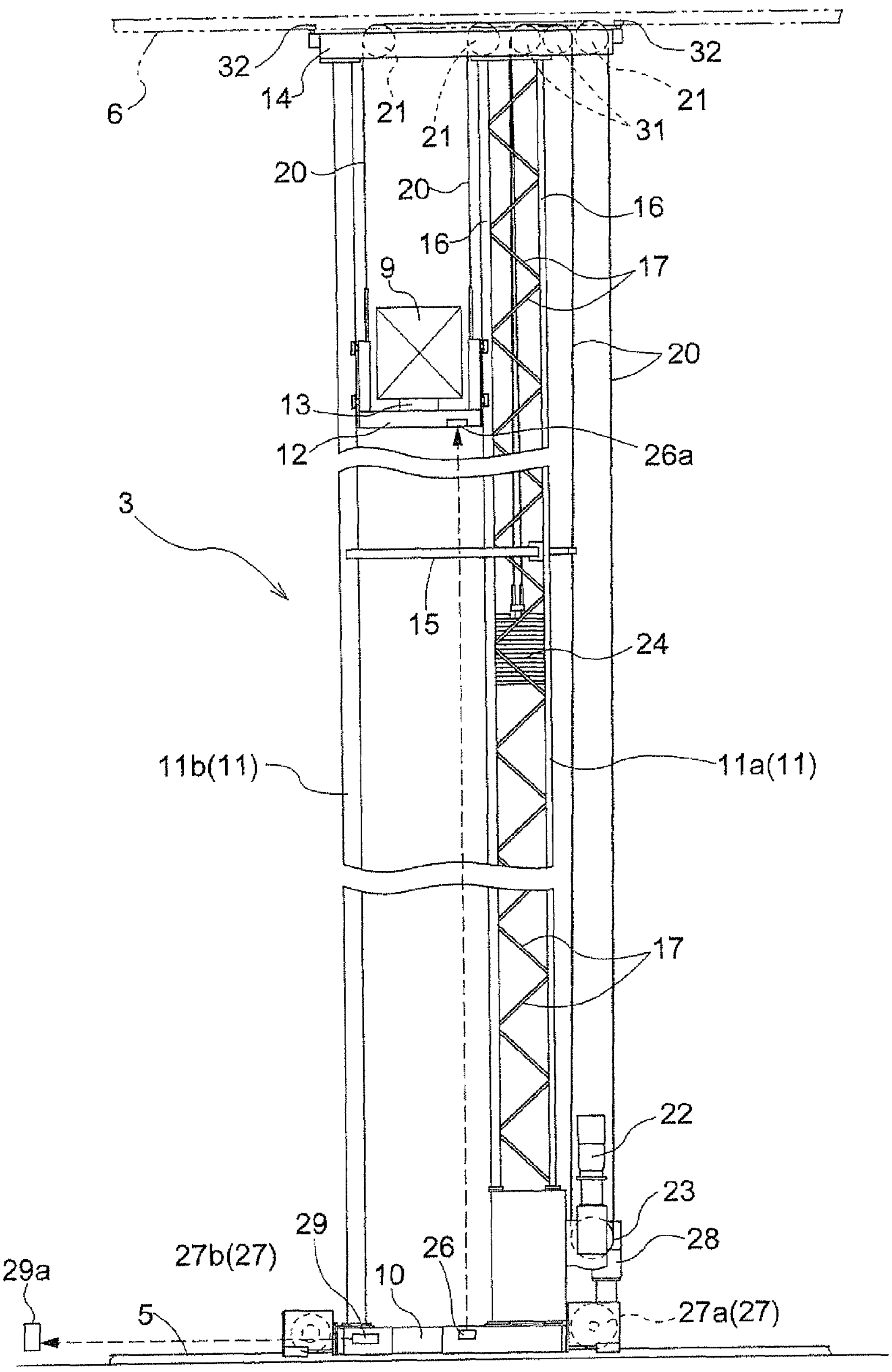
FIG. 3 is a side view of a stacker crane.

As shown in FIG. 3, the stacker crane 3 includes a traveling carriage 10 running along the travel rail 5, a pair of front and rear lift guide masts 11 mounted upright on the traveling carriage 10, a lift 12 vertically movable along the pair of front and rear lift guide masts 11, and an article transfer device 13 (a fork-type article transfer device, for example) mounted on the lift 12 to act as article transfer means.

The lift guide masts 11 are mounted at a front end portion and a rear end portion of the traveling carriage 10, respectively, in the running direction of the traveling carriage 10. The front and rear lift guide masts 11 are connected to each other through an upper frame 14 at upper end portions thereof. Also, the front and rear lift guide masts 11 are connected to each other through an intermediate frame 15 at longitudinal intermediate portions thereof.

Guide rollers 32 are provided in the upper frame 14 to come into contact with the upper guide rail 6 to be guided by the upper guide rail 6. As shown in FIG. 2, the upper guide rail 6 is arranged to be displaced from a position directly above the travel rail 5 in a transverse direction (leftward in FIG. 2) as viewed from the running direction of the travel carriage 10.

Figure 4:
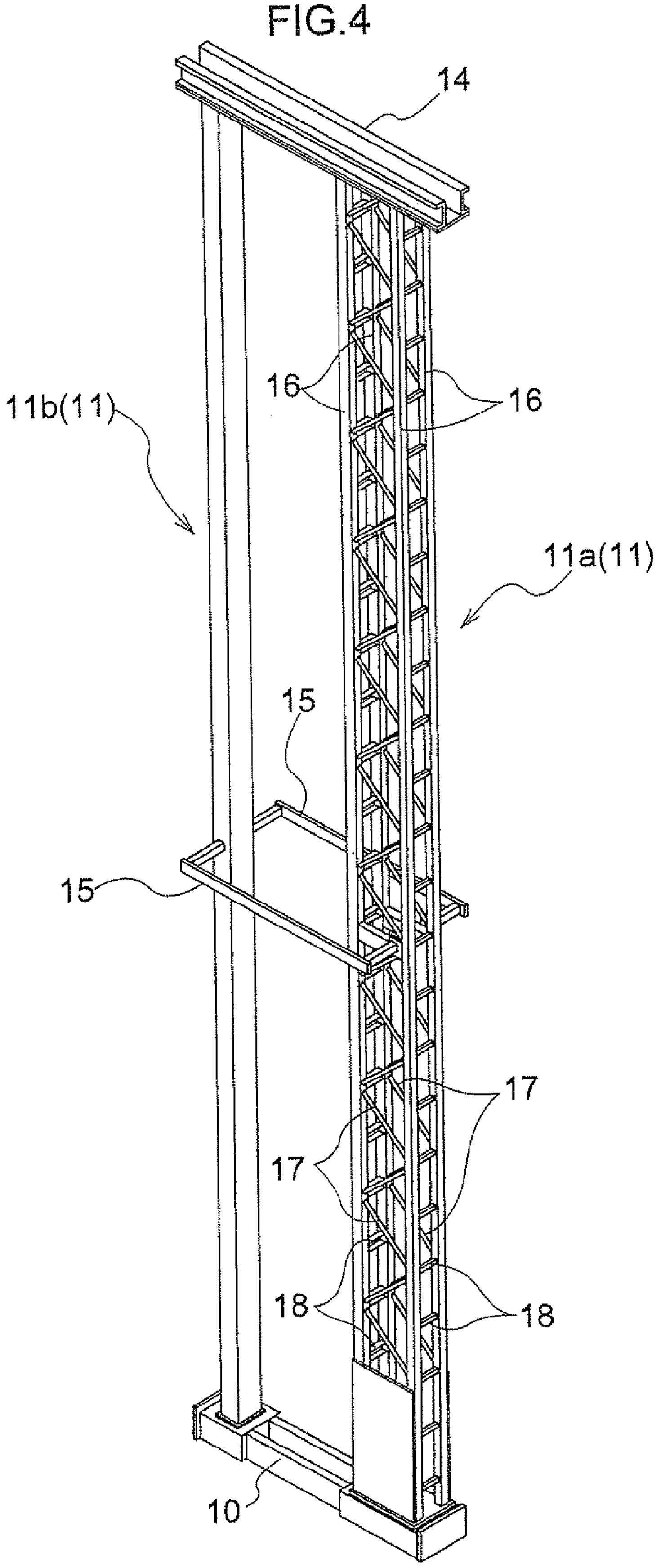
FIG. 4 is a perspective view of a pair of right and left lift guide masts.
Figure 5:
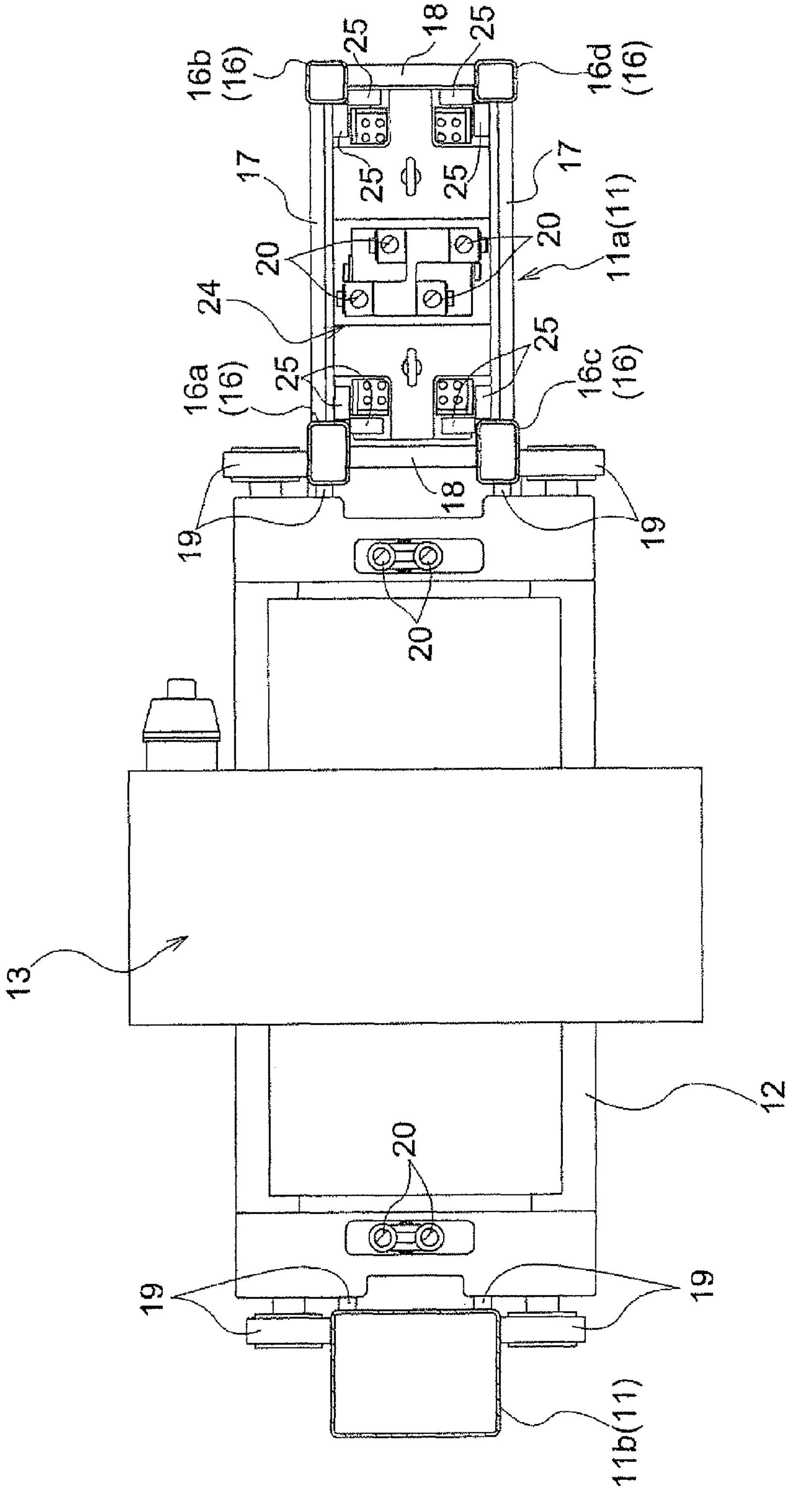
FIG. 5 is a top plan view of the pair of right and left lift guide masts and a lift.
Figure 6:
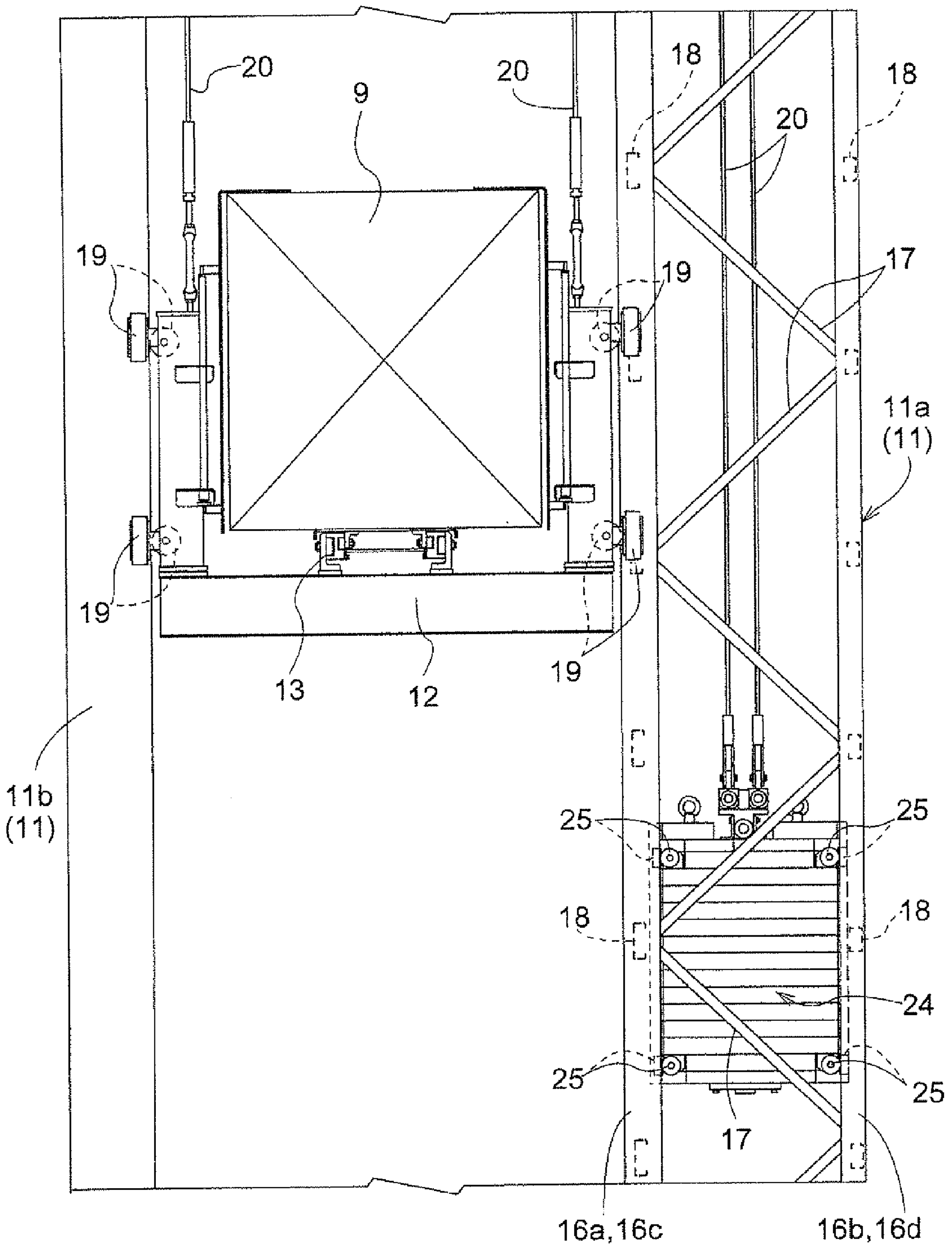
FIG. 6 is a side view of the pair of right and left lift guide masts and the lift.
Figure 7:
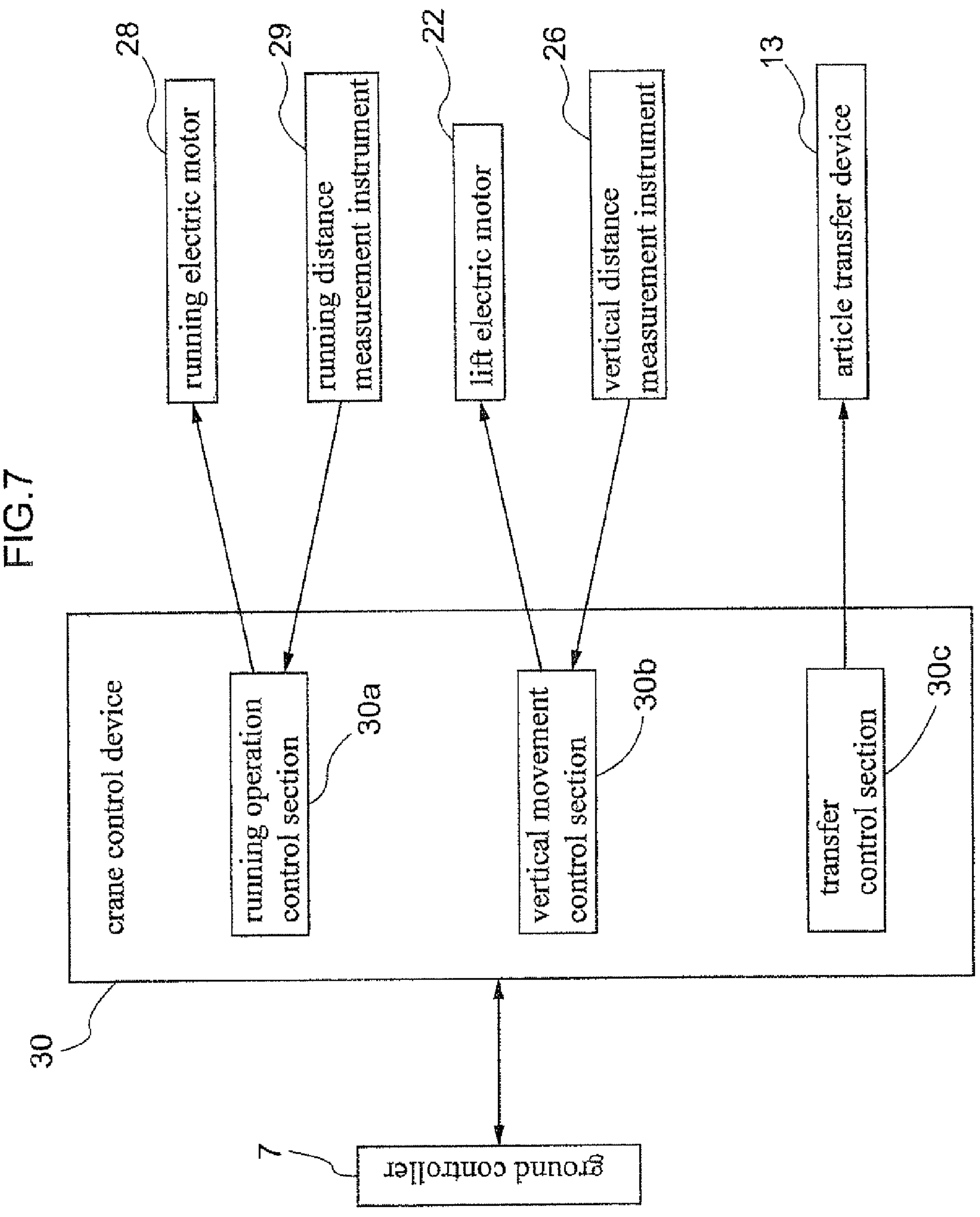
FIG. 7 is a control block diagram of the automated warehouse.

As shown in FIGS. 4 to 6, the main lift guide mast **11*a* that is one of the pair of front and rear lift guide masts 11 includes a plurality of posts 16 mounted upright to be spaced from each other, and a plurality of diagonal members 17 for connecting the adjacent posts 16 to each other. The main lift guide mast 11*a* has a rectangular horizontal section with the posts 16** arranged in the four corners of the rectangular shape.

The auxiliary lift guide mast **11*b* that is the other of the pair of front and rear lift guide masts 11** comprises a rectangular pipe having a rectangular horizontal section. The rectangular pipe is hollow and preferably made of metal.

The horizontal section of the main left guiding mast 11*a* has an area that is larger than that of the auxiliary lift guide mast 11*b*.

The posts 16 of the main lift guide mast 11*a* comprises four posts, a first post 16*a*, a second post 16*b*, a third post 16*c*, and a fourth post 16*d*, that are arranged in the four corners of the rectangular shape. Each of the four posts 16 comprises the rectangular pipe having a rectangular horizontal section. The horizontal section of each of the first post 16*a* and the third post 16*c* has an area that is larger than that of each of the second post 16*b* and the fourth post 16*d*. The rectangular pipe is hollow and preferably made of metal. The area of the horizontal section of the main lift guide mast 11*a* can be defined as the area of the rectangle formed by the four posts 16.

The first post 16*a* and the third post 16*c* are arranged in positions closer to the auxiliary lift guide mast 11*b* in the running direction of the traveling carriage 10, while the second post 16*b* and the fourth post 16*d* are arranged in positions remote from the auxiliary lift guide mast 11*b* in the running direction of the traveling carriage 10. A distance between the first post 16*a* and the second post 16*b* and a distance between the third post 16*c* and the fourth post 16*d* in the running direction of the traveling carriage 10 are greater than a distance between the first post 16*a* and the third post 16*c* and a distance between the second post 16*b* and the fourth post 16*d* in a direction perpendicular to the running direction of the traveling carriage 10, respectively.

Further, a distance between the main lift guide mast 11*a* and the auxiliary lift guide mast 11*b* is preferably greater than a width of the main lift guide mast 11*a* in the running direction.

At lower end portions of the main lift guide mast 11*a* are mounted a plate-like connecting member for connecting the first post 16*a* with the second post 16*b* and another plate-like connecting member for connecting the third post 16*c* with the fourth post 16*d*, respectively.

The plurality of diagonal members 17 are provided to connect the first post 16*a* with the second post 16*b* and connect the third post 16*c* with the fourth post 16*d* arranged to be spaced part from each other in the running direction of the traveling carriage 10, respectively. The diagonal members 17 are serially arranged in the vertical direction such that the members adjacent to each other in the vertical direction intersect each other.

The first post 16*a* and the third post 16*c*, and the second post 16*b* and the fourth post 16*d*, which are arranged spaced from each other in the direction perpendicular to the running direction of the traveling carriage 10, are connected to each other, respectively, through horizontal members 18 arranged to meet ends of the plurality of diagonal members 17.

Both the plurality of diagonal members 17 and the plurality of horizontal members 18 are connected to the posts 16 by welding at their ends, respectively.

Each of the pair of front and rear lift guide masts 11 comes into contact with a plurality of lift guide rollers 19 provided in the lift 12 to vertically guide the lift 12. The lift guide rollers 19 includes two types of rollers, that is to say, rollers for limiting movement of the lift 12 in the running direction of the traveling carriage 10 and rollers for limiting movement of the lift 12 in the transverse direction of the traveling carriage 10. The two types of rollers 19 are provided in vertical pairs at four corners of the lift 12, respectively, as viewed from the top.

The lift guide rollers 19 provided adjacent to the main lift guide mast 11*a* contact a side surface of the first post 16*a* and an outer surface of the third post 16*c*. The lift guide rollers 19 provided adjacent to the auxiliary lift guide mast 11*b* contact outer surfaces of the square pipe forming the auxiliary lift guide mast 11*b*.

As shown in FIG. 3, lift wires 20 are provided to act as cable-like members (cord-like members) for suspending and supporting the lift 12. Each of the lift wires 20 is connected to the lift 12 at one end thereof and to a counterweight 24 at the other end thereof. The four lift wires 20 are provided, two of which are connected to one end portion of the lift 12 in the running direction of the traveling carriage 10, and the other two of which are connected to the other end portion of the lift 12 in the running direction of the traveling carriage 10. The four lift wires 20 are connected to the lift 12 at the plural positions in this manner.

The four lift wires 20 are collectively wound around a plurality of first guide sheaves 21 provided in the upper frame 14, and further wound around a driven rotary member 23 acting as a rotary member rotatably driven by a lift electric motor 22. The lift wires 20 are moved in their longitudinal direction as the driven rotary member 23 is rotated forward and backward by the lift electric motor 22 thereby to vertically move the left 12. As noted above, the lift electric motor 22 acts as lift driving means for moving the lift 12 vertically with the plurality of lift wires 20 being collectively wounded around the driven rotary member 23.

Further, the lift wires 20 are wound around second guide sheaves 31 provided in the upper frame 14 after being wound around the driven rotary member 23, and connected to the counterweight 24 at the other ends thereof opposite to the ends connected to the lift 12. The counterweight 24 is adapted to vertically move in the direction opposite to the moving direction of the lift 12.

The counterweight 24 is vertically movable inside the main lift guide mast 11*a*. Since the main lift guide mast 11*a* has the rectangular horizontal section, the counterweight 24 also has a rectangular horizontal section.

The main lift guide mast 11*a* has inner surfaces contacting a plurality of weight guide rollers 25 provided in the counterweight 24 to guide the counterweight 24 in the vertical direction. The weight guide rollers 25 includes two types of rollers, that is to say, rollers for limiting the movement of the counterweight 24 in the running direction of the traveling carriage 10, and rollers for limiting the movement of the counterweight 24 in the transverse direction of the traveling carriage 10. The two types of weight guide rollers 25 are provided in vertical pairs at four corners of the counterweight 24, respectively, as viewed from the top. In this way, the counterweight 24 is guided in the vertical direction using the inner surfaces of the main lift guide mast 11*a* having the rectangular horizontal section to be properly moved vertically even in the interior of the main lift guide mast 11*a*.

A vertical distance measuring instrument 26 is provided in the traveling carriage 10 for detecting a vertical position of the lift 12 in a vertical moving path thereof. The vertical distance measuring instrument 26 is adapted to emit a distance measuring beam toward a lift reflector 26*a* provided in the lift 12 along the direction of the vertical movement of the lift 12 and receive light reflected at the lift reflector 26*a* thereby measuring a distance to the lift 12 to detect the vertical position of the lift 12.

Further, the traveling carriage 10 includes a pair of front and rear traveling wheels 27 for running the travel rail 5. One of the pair of front and rear traveling wheels 27 (adjacent to the main lift guide mast 11*a*) acts as a drive wheel 27*a* to be rotatably driven by a running electric motor 28, while the other of the pair of front and rear traveling wheels 27 (adjacent to the auxiliary lift guide mast 11*b*) acts as a freely-rotatable driven wheel 27*b*.

The drive wheel 27*a* is rotatably driven by actuation of the running electric motor 28 to allow the traveling carriage 10 to run along the travel rail 5.

A running distance measuring instrument 29 is provided in the traveling carriage 10 for detecting a running position of the traveling carriage 10 in the travel rail 5. The running distance measuring instrument 29 is adapted to emit a distance measuring beam toward a running distance reflector 29*a* provided at one end of the travel rail 5 along the longitudinal direction of the travel rail 5 and receive light reflected at the running distance reflector 29*a* thereby measuring a distance to the running distance reflector 29*a* to detect the running position of the travel carriage 10.

The stacker crane 3 includes a crane control device 30 for controlling operations of the stacker crane 3 based on commands received from the ground controller 7. The crane control device 30 is adapted to control the running operation of the traveling carriage 10 and the lifting operation of the lift 12 in order to shift the article transfer device 13 to a stop position for transferring the article to/from the storage section 4 or the loading platform 8, and also to control the transfer operation of the article transfer device 13 in order to retrieve the article 9 supported on the storage section 4 or the loading platform 8 or to place the article 9 to the storage section 4 or the loading platform 8 with the article transfer device 13 being stopped at the stop position for transferring the article.

The crane control device 30 has a running operation control section 30*a* for controlling the running operation of the traveling carriage 10 in order to shift the article transfer device 13 to the stop position for transferring the article in the running direction of the traveling carriage 10 based on detected information received from the running distance measuring instrument 29, a vertical movement control section 30*b* for controlling the lifting operation of the lift 12 in order to shift the article transfer device 13 to the stop position for transferring the article in the vertical direction of the lift 12 based on detected information received from the vertical distance measuring instrument 26, and a transfer control section 30*c* for controlling the transferring operation of the article transfer device 13 in order to retrieve the article 9 supported on the storage section 4 or the loading platform 8 or to place the article 9 to the storage section 4 or the loading platform 8.

The running operation control section 30*a* is adapted to actuate the running electric motor 28 to allow the traveling carriage 10 to run. When the running position of the traveling carriage 10 detected by the running distance measuring instrument 29 agrees with the strop position for transferring the article in the running direction of the traveling carriage 10, the running electric motor 28 is stopped to position the article transfer device 13 in the stop position for transferring the article in the running direction of the traveling carriage 10.

The vertical movement control section 30*b* is adapted to actuate the lift electric motor 22 to allow the lift 12 to move vertically. When the vertical position of the left 12 detected by the vertical distance measuring instrument 26 agrees with the strop position for transferring the article in the vertical direction of the lift 12, the lift electric motor 22 is stopped to position the article transfer device 13 in the stop position for transferring the article in the vertical direction of the lift 12.

When the article 9 supported on the storage section 4 or the loading platform 8 is retrieved, the transfer control section 30*c* operates the fork-type article transfer device 13 to project and then elevates the lift 12 by a predetermined distance at the vertical movement control section 30*b*, thereby allowing the article 9 supported on the storage section 4 or the loading platform 8 to be placed and supported to the article transfer device 13. Then, the transfer control section 30*c* operates the fork-type article transfer device 13 to be retracted.

When the article 4 is placed on the storage section 4 or the loading platform 8, the fork-type article transfer device 13 is operated to project, and the subsequent operations are the same as in retrieving the article 9 supported on the storage section 4 or the loading platform 8 except the operation by the vertical movement control section 30*b* for lowering the lift 12 by a predetermined distance.

In this way, the crane control device 30 is adapted to control the operations of the stacker crane 3 based on the commands received from the ground controller 7 thereby to perform storing operations for taking out the article 9 supported on the loading platform 8 to place the article 9 on the storage section 4, or retrieving operations for retrieving the article 9 supported on the storage section 4 to place the article 9 on the loading platform 8.

OTHER EMBODIMENTS (1) In the above-noted embodiment, the plurality of diagonal members 17 are provided in the main lift guide mast 11*a* to connect the posts 16 that are adjacent to each other in the running direction of the traveling carriage 10. However, the direction in which the adjacent posts 16 to be connected by the diagonal members 17 are positioned with respect to each other may be a matter of design choice member. For example, the diagonal members 17 may be provided to connect the posts 16 adjacent to each other in the running direction of the traveling carriage 10 or to connect the posts 16 adjacent to each other in the transverse direction of the traveling carriage 10.

(2) In the above-noted embodiment, the auxiliary lift guide mast 11*b* comprises the rectangular pipe having the rectangular horizontal section. Here, the design of the auxiliary lift guide mast 11*b* may be varied as appropriate as long as the horizontal section thereof is smaller than that of the main lift guide mast 11*a*. For example, in the similar manner to the main lift guide mast 11*a*, the auxiliary lift guide mast may comprise a plurality of posts mounted upright to be spaced from each other and a plurality of diagonal members for connecting the adjacent posts together.

(3) In the above-noted embodiment, the main lift guide mast 11*a* has the rectangular horizontal section with the posts 16 arranged at the four corners of the rectangular shape. The horizontal section of the main lift guide mast 11*a* may be varied as appropriate. For example, it may be a triangle or a pentagon with the posts 16 at their corners.

(4) In the above-noted embodiment, the running position of the traveling carriage 10 is detected by the running distance measuring instrument 29. The means for detecting the running position of the traveling carriage 10 may be varied as appropriate. For example, a rotary encoder may be provided in the traveling carriage 10 for detecting the running distance measured from the reference position in the travel rail 5 thereby detecting the running position of the traveling carriage 10.

Also, the means for detecting the vertical position of the lift 12 is not limited to the vertical distance measuring instrument 26, but may be varied as appropriate.

(5) In the above-noted embodiment, the stacker crane is provided with the crane control device 30 for controlling the operations of the stacker crane 3 based on the commands received from the ground controller 7. Instead of providing the crane control device 30 in the stacker crane 3, a communication network may be established between the ground controller 7, an inverter in the lift electric motor 22, an inverter in the running electric motor 28, and the article transfer device 13. The operations of the stacker crane 3 may be controlled by the ground controller 7 transmitting various kinds of commands such as starting the operations or stopping the operations to the inverter in the lift electric motor 22, the inverter in the running electric motor 28, and the article transfer device 13 through the communication network.

The article transporting apparatus in accordance with the present invention may be used in an automated warehouse, for example.

The invention claimed is:

1. An article transporting apparatus comprising:

a traveling carriage adapted to run along a travel rail;

a pair of front and rear lift guide masts mounted on the traveling carriage spaced apart from each other and connected to each other at upper ends thereof by an upper frame;

a lift adapted to vertically move along the pair of front and rear lift guide masts;

an article transfer device provided in the lift;

a plurality of main lift guide rollers provided in the lift to come into contact with a main lift guide mast representing one of the pair of front and rear lift guide masts; and a plurality of auxiliary lift guide rollers provided in the lift to come into contact with an auxiliary lift guide mast representing the other of the pair of front and rear lift guide masts, wherein the main lift guide mast includes four posts mounted upright to be spaced apart from each other and a plurality of diagonal members for connecting the adjacent posts to each other, the main lift guide mast having a horizontal section area greater than that of the auxiliary lift guide mast;

the four posts are mounted upright to be spaced from each other at least in a running direction of the traveling carriage;

the plurality of diagonal members are adapted to connect the posts adjacent to each other at least in the running direction of the traveling carriage;

the horizontal section of the main lift guide mast has a rectangular shape defined by the four posts;

the four posts are arranged such that a distance between posts adjacent to each other in the running direction is set greater than a distance between posts adjacent to each other in a direction perpendicular to the running direction, the auxiliary guide mast has a single post, the plurality of main lift guide rollers are configured to come into contact with each of two of the four posts provided adjacent to the auxiliary lift guide mast in the running direction, at least two of the plurality of main lift guide rollers are positioned to come into contact with an outer side of the two posts perpendicular to the running direction to limit movement of the lift in a direction perpendicular to the running direction of the traveling carriage, and at least two of the plurality of main lift guide rollers are positioned to come into contact with a side of the two posts facing the auxiliary lift guide mast in the running direction to limit movement of the lift in the running direction of the traveling carriage, and the plurality of auxiliary lift guide rollers are configure to come into contact with the single post, at least two of the plurality of auxiliary lift guide rollers are positioned to each come into contact with opposite outer sides of the single post perpendicular to the running direction to limit movement of the lift in the direction perpendicular to the running direction of the traveling carriage, and at least one of the plurality of auxiliary lift guide rollers are positioned to come into contact with a side of the single post facing the main lift guide mast in the running direction to limit movement of the lift in the running direction of the traveling carriage.

2. The article transporting apparatus as defined in claim 1 further comprising:

a plurality of cord members connected to the lift at plural positions for suspending and supporting the lift;

a lift driving device for moving the lift vertically with the plurality of cord members being collectively wound around a rotary member; and a counterweight connected to the plurality of cord members at the other ends thereof opposite to ends connected to the lift to move vertically in a direction opposite to the moving direction of the lift, wherein the counterweight has a rectangular horizontal section and is adapted to vertically move inside the main lift guide mast, and the four posts each have an outer surface for guiding the counterweight in the vertical direction.

3. The article transporting apparatus as defined in claim 1, further comprising a pair of front and rear traveling wheels provided in the traveling carriage for running on the travel rail, wherein one of the pair of front and rear traveling wheels adjacent to the main lift guide mast acts as a drive wheel, and the other of the pair of front and rear traveling wheels adjacent to the auxiliary lift guide mast acts as a freely-rotatable driven wheel.

* * * * *

UNITED STATES PATENT AND TRADEMARK OFFICE

CERTIFICATE OF CORRECTION

PATENT NO. : 8,550,762 B2
APPLICATION NO. : 12/526387
DATED : October 8, 2013
INVENTOR(S) : Yuichi Ueda et al.

It is certified that error appears in the above-identified patent and that said Letters Patent is hereby corrected as shown below:

In the Claims:

Column 9, Line 49, Claim 1, after "auxiliary" insert -- lift --

Signed and Sealed this
Eleventh Day of February, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,550,762 B2
APPLICATION NO. : 12/526387
DATED : October 8, 2013
INVENTOR(S) : Ueda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 735 days.

Signed and Sealed this
Fifteenth Day of September, 2015

Michelle K. Lee

Michelle K. Lee
*Director of the United States Patent and Trademark Office*